United States Patent [19]

[11] 3,773,972

[45] Nov. 20, 1973

Kroll et al.

[54] TELEVISION AERIAL MEASUREMENT RECEIVER

[75] Inventors: Gunter Kroll, Hamburg; Herbert Struwe, Ellerbeck; Gunther Fliess, Hamburg, all of Germany

[73] Assignee: U.S. Philips Corporation, New York, N.Y.

[22] Filed: Feb. 9, 1972

[21] Appl. No.: 224,728

[30] Foreign Application Priority Data

Feb. 26, 1971 Germany .................. P 21 09 220.6

[52] U.S. Cl. ......................... 178/7.3 R, 178/DIG. 4

[51] Int. Cl. ............................................. H04n 7/02

[58] Field of Search ...................... 178/7.3 R, 7.5 R, 178/DIG. 4; 325/67, 363; 324/990, 111; 239/92 NT

[56] References Cited

UNITED STATES PATENTS 3,502,804 3/1970 Barr ................................ 178/7.5 R 3,395,347 7/1968 Hollis et al......................... 324/111

OTHER PUBLICATIONS

Simplify Your DVM Selection, Electronic Design 4, Feb. 15, 1968 Pg. 76–80

*Primary Examiner*—Howard W. Britton

*Assistant Examiner*—Joseph A. Orsino, Jr.

*Attorney*—Frank R. Trifari

[57] ABSTRACT

A system for measuring signal stength wherein line flyback pulses are applied to a digital counting means during a counting period proportional to the signal level, which counting means are periodically reset to zero by the field flyback pulses.

7 Claims, 2 Drawing Figures

TELEVISION AERIAL MEASUREMENT RECEIVER

The invention relates to a television aerial measurement receiver including a television reception section having a picture tube and a calibrated indicator.

Such measurement receivers are known and are described, for example, in "Technik der Empfangsantennen fur Rundfunk und Fernsehen" Volume 5: "Messung und Pruefung von Antennenanlagen" published by ZVEI, 1969.

When planning, building and adjusting television receiver aerials, particularly for community aerial systems, a flawless reception is to be ensured by providing each receiving station with a sufficient HF level. This level is to be approximately between 54 and 84 dBμV at a 60-Ohm input. Accordingly, amplifiers are to be provided as a function of the field strength present in the receiving area and the required cable lengths. The television aerial measurement receivers mentioned hereinbefore thus make it possible to measure the levels at the individual receiving stations exactly.

However, the operation of known measurement receivers is comparatively complicated because a plurality of adjustments or readings are required. Firstly a calibrated attenuator is to be adjusted and its value is to be taken into account. Secondly a so-called channel factor is to be taken into account because the amplification of the receiver is not equally large for all channels; in addition tuning to the transmitter is to be checked and finally the deflection on the indicator is to be read. These operations not only require great care, but are also time-consuming.

The object of the present invention is to provide a television aerial measurement receiver which cannot only be operated more easily, but also provides a digital indication of the level so that reading errors are excluded.

The invention is characterized in that the line flyback pulses of the televison receiver are applied during a counting period which is proportional to the HF level to digital counting and indicating means which are periodically reset to zero by the field flyback pulses of the television receiver.

Since for instance 625/2 line flyback pulses occur between two field flyback pulses, the digital counter may cover and indicate a maximum number of approximately 280 pulses which in case of appropriate calibration corresponds to a level of 280 dBμV. Since the suitable levels are, however, between 54 and 84 dBμV and between approximately 30 and 130 dBμV in the extended range, only a fraction of the maximum counting capacity is utilised.

Since counting is controlled by the synchronised pulses of the television receiver, the counting pulses have the same accuracy with time as the synchronous signals of the received television transmitter.

In order that the invention may be readily carried into effect, an embodiment thereof will now be described in detail by way of example with reference to the accompanying diagrammatic drawings in which.

Figure 1:
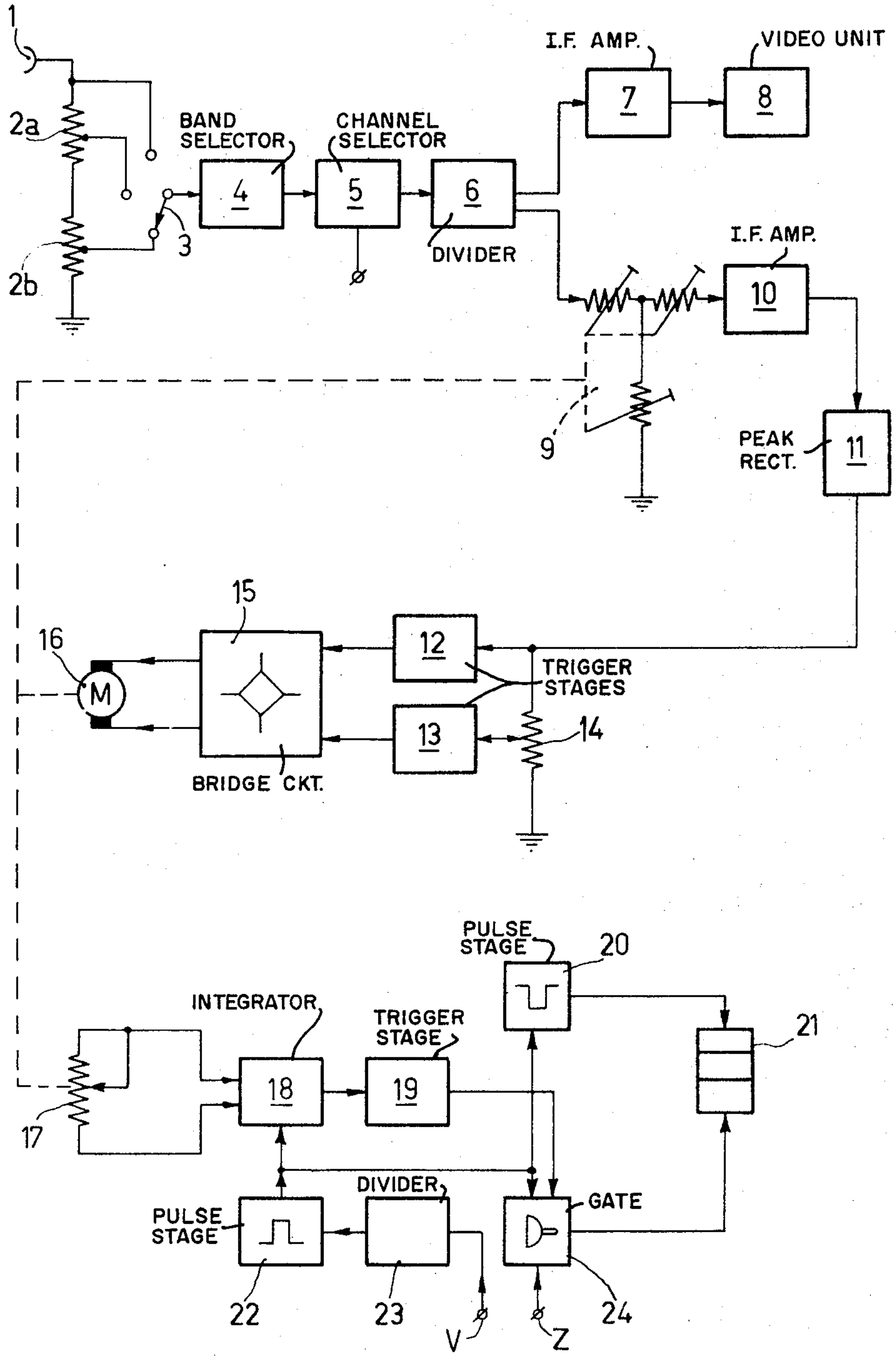
FIG. 1 shows a block-schematic circuit diagram of the measurement receiver

The HF-voltage applied to an input terminal 1 of the measurement receiver is firstly passed on to an input attenuator **2*a*, 2*b* from which the HF-voltage is derived through a switch 3 and is applied to a UHF/VHF-band 4 present in each television receiver. The input attenuator 2*a* has an attenuation of approximately 10 dB and attenuator 2*b* has an attenuation of 40 dB. The level may be reduced, if desired, by this input attenuators 2*a*, 2*b* so that the measuring range of the measurement receiver is considerably extended namely to approximately 30 to 130 dBμV. The HF-signal is applied in known manner from band 4 to a UHF/VHF-channel selector 5 and the IF-signal is at first applied from this selector to a divider 6. From this the IF-signal is applied to an IF amplifier 7 and a video unit 8 present in any conventional television receiver. The video unit includes video stages, line - and field-synchronizing stages, a picture tube and so on and serves to make the signal visible in known manner on the picture screen so that optical assessment of the reception quality is possible at the same time. The IF-signal is also applied from divider 6 to a second continuously adjustable attenuator 9 and from this attenuator to a second broad-band IF-amplifier 10. The output voltage of this amplifier is rectified in a peak rectifier 11 and the output voltage is applied directly to a first trigger stage 12 and via a potentiometer 14 to a second trigger stage 13. The output voltages of these trigger stages 12 and 13 are applied to a bridge circuit 15 shown in FIG. 2, whose output voltage drives a motor 16 having a shaft to which both the attenuator 9 and a measuring potentiometer 17 are mechanically coupled. Dependent on the position of the wiper on measuring potentiometer 17 the supply current of an additionally arranged integrator 18 is varied. The output voltage of integrator 18 controls a further trigger stage 19 at whose output stop signals occur which stop the line flyback pulses applied from unit 8 through a gate 24 to digital counter 21 which has, for example, three stages. The integrator 18 is controlled by a further pulse stage 22 which receives the field flyback pulses V from the unit 8 of the conventional television circuit via a 2-to-1 frequency divider 23. By division of the field frequency a measuring range of up to 560 dBμV is achieved and a very stable and undisturbed indication is obtained. The line flyback pulses Z of the television receiver are applied as counting pulses to the digital counter 21 via a gating circuit 24 to which also the stop pulses from trigger stage 19 and the reset and start pulses from pulse stage 22** are applied. In this case the start is given by the trailing edge of the reset pulse.

Figure 2:
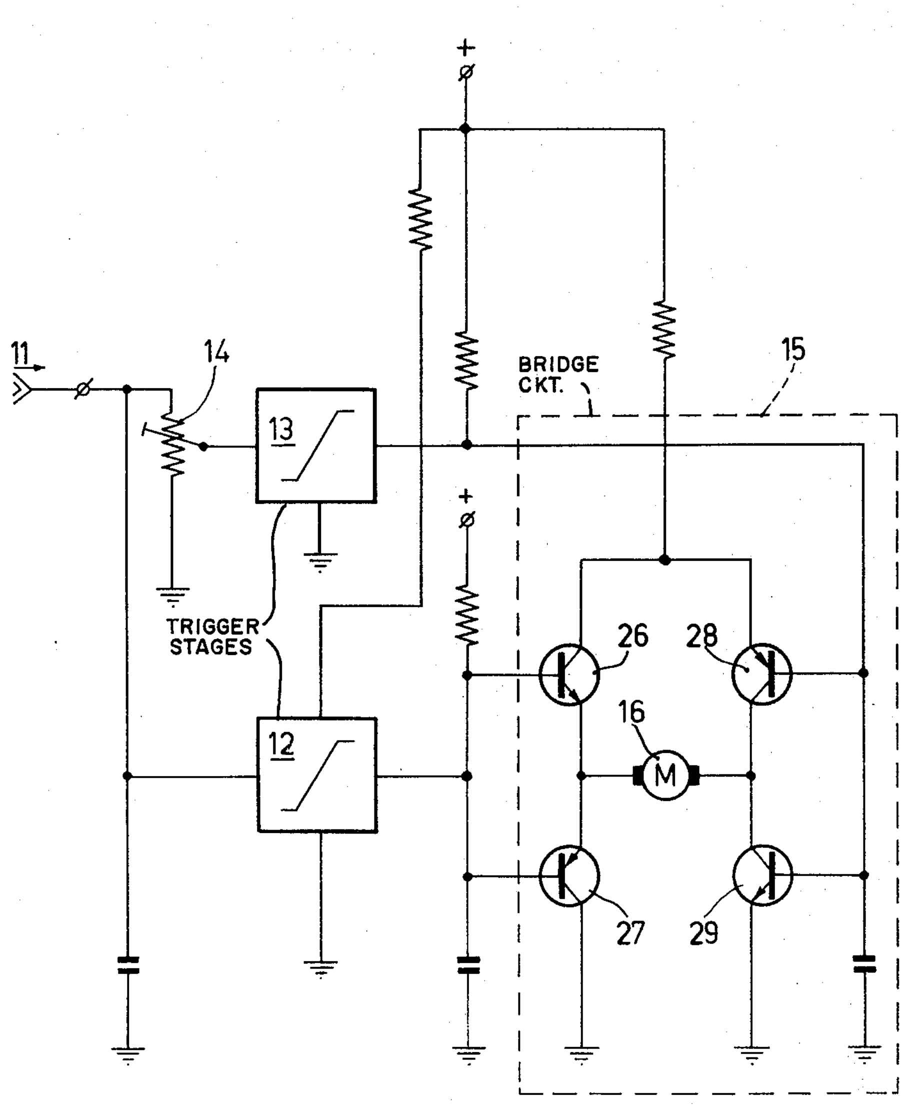
FIG. 2 shows a circuit diagram for the motor control.

The voltage provided by the peak rectifier 11 is directly applied to the trigger stage 12 and through potentiometer 14 to trigger stage 13 (FIG. 2). As a result the response thresholds of trigger stages 12 and 13 have variable values. The outputs of the trigger stages 12 and 13 control a bridge circuit which consists of four transistors 26, 27, 28, 29 while the motor 16 is located in their diagonals. Dependent on the value of the voltage originating from peak rectifier 11 either the two trigger stages are cut off or both are conducting or only one is conducting. As a result either the transistor pairs 26, 29 or 27,28 or the pairs 27, 29 and 26, 28 are conducting. Thus the motor will either be running forwards or in reverse or it will stop.

Since the attenuator 9 and the measuring potentiometer 17 are both coupled to the shaft of motor 16, a rotation of the shaft results in a variation of the signal voltage applied to the second IF-amplifier and a variation of the supply current of integrator 18. Further-more, since the output voltage of integrator 18 controls trigger stage 19, which in turn provides the stop pulse for counter 21 via gate 24, the counting process is determined as a function of the position of the wiper on measuring potentiometer 17 and hence of the adjustment of the motor shaft and hence again of the output voltage of rectifier 11 and finally of the input level at terminal 1. This means that the number of line flyback pulses counted by counter 21 is directly proportional to the input voltage so that the indication of counter 21 can be effected directly in dB$\mu$V.

When the input voltage remains below a minimum value the indication of counter 21 can be suppressed. On the other hand, it is possible to reduce the input level by given values, for example, 10 and 40 dB with the aid of the input attenuators 2*a*, 2*b*, when the input voltage is too high. To this end a special signal may be applied to the counter, which becomes active when a given level is exceeded by which, for example, the indication is caused to flicker or some figure, say 9, is caused to light up in the first position.

By including the frequency divider 23 in the lead conveying the field flyback pulses the counting period is increased from 20 msec to 40 msec. This results in an undisturbed indication because due to the 312.5 lines of a field the indication would otherwise vary by a value of 0.5 for each field.

To ensure that the integrator 18 is discharged at the commencement of each measuring cycle, said integrator includes a discharge circuit not shown in the drawing, which circuit consists of an electronic switch controlled by the reset-start pulse.

The broad-band structure of the second IF-amplifier 10 renders the tuning of channel selector 5 relatively uncritical. The response curve of the second IF-amplifier is plane in the vicinity of the vision carrier frequencies so that for precise measurement the adjustment of the television receiver to an optimum image is sufficient.

What is claimed is:

1. A circuit for measuring the strength of a television signal having line and field flyback pulses, said circuit comprising means having an input means for receiving said line flyback pulses for digitally counting the line flyback pulses, means coupled to said counting means for determining a counting period in accordance with the strength of said signal, and means having an input means for receiving said field flyback pulses and coupled to said counting means for resetting and starting said counter to zero upon receiving said field pulses.

2. A circuit as claimed in claim 1 further comprising a frequency divider having an input means for receiving said field flyback pulses and an output coupled to said resetting means.

3. A circuit as claimed in claim 1 further comprising an input attenuator having an input means for receiving said television signal and an output coupled to said determining means.

4. A circuit as claimed in claim 3 further comprising switching means coupled to said input attenuator for controlling the attenuation of said attenuator.

5. A circuit as claimed in claim 1 wherein said determining means comprises an integrator coupled to said counting means and having a discharge input and wherein said resetting means comprises a pulse stage having an input means for receiving said field flyback pulses and an output coupled to said discharge input and said counting means.

6. A circuit as claimed in claim 5 further comprising means having an input for receiving said television signal for converting said signal to an intermediate frequency signal, a divider coupled to converting means, a controllable attenuator coupled to said divider, a rectifier means coupled to said attenuator for providing a rectified signal, and a control circuit means coupled to said rectifier, and said attenuator and said integrator for controlling the amount of the attenuation of said attenuator and the integration period of said integrator in accordance with the amplitude of said rectified signal.

7. A circuit as claimed in claim 6 wherein said determining means comprises a potentiometer means for varying said integration period coupled to said integrator; said control circuit comprising a pair of trigger stages coupled to said rectifier and having variable threshold levels, a bridge circuit having four transistors coupled to said threshold circuits, a motor coupled to said transistors and having a shaft mechanically coupled to said attenuator and said potentiometer.

* * * * *